United States Patent [19]
Murakami et al.

[11] Patent Number: 6,011,366
[45] Date of Patent: Jan. 4, 2000

[54] ELECTRIC BICYCLE

[75] Inventors: Seiji Murakami, Osaka; Hideaki Aoki, Kyoto, both of Japan

[73] Assignee: Sanyo Electric Co., Ltd., Osaka, Japan

[21] Appl. No.: 08/904,186

[22] Filed: Jul. 31, 1997

[30] Foreign Application Priority Data

| Aug. 2, 1996 | [JP] | Japan | ................................. 8-205070 |
| Aug. 2, 1996 | [JP] | Japan | ................................. 8-205071 |
| Aug. 2, 1996 | [JP] | Japan | ................................. 8-205072 |
| Dec. 10, 1996 | [JP] | Japan | ................................. 8-329769 |

[51] Int. Cl.⁷ ............................. H02K 7/00; B62D 61/02
[52] U.S. Cl. ............................. 318/1; 318/139; 180/220; 180/231; 180/65.2
[58] Field of Search ................................. 318/1, 2, 11, 12, 318/139; 180/220–222, 230, 231, 223, 224, 65.2, 65.6

[56] References Cited

FOREIGN PATENT DOCUMENTS

| 58-89483 | 5/1983 | Japan . |
| 5-262273 | 10/1993 | Japan . |
| 5-278670 | 10/1993 | Japan . |
| 7-137681 | 5/1995 | Japan . |
| 7-172375 | 7/1995 | Japan . |
| 7-228286 | 8/1995 | Japan . |
| 7-291175 | 11/1995 | Japan . |
| 7-329873 | 12/1995 | Japan . |

*Primary Examiner*—Brian Sircus
*Attorney, Agent, or Firm*—Nikaido, Marmelstein, Murray & Oram LLP

[57] ABSTRACT

The invention provides an electric bicycle comprising an electric motor mounted on the body of the bicycle between the saddle and the outer periphery of the rear wheel, and a belt transmission mechanism for transmitting the rotation of the motor to the rear wheel on speed reduction. The belt transmission mechanism comprises a drive pulley provided between the saddle and the outer periphery of the rear wheel for receiving the power of the motor, a driven pulley having the same diameter as the rim of the rear wheel and rotatable with the rear wheel alongside the rim, and a belt reeved around the drive pulley and the driven pulley. These components realize a simple construction wherein the rotation of the motor can be transmitted to the rear wheel as reduced to the desired speed in a smaller number of stages.

7 Claims, 12 Drawing Sheets

FIG. 12    PRIOR ART

ELECTRIC BICYCLE

FIELD OF THE INVENTION

The present invention relates to electrically drivable bicycles equipped with an electric motor on the body of the bicycle.

BACKGROUND OF THE INVENTION

Progress has been made in recent years in developing bicycles which comprise a bicycle body drivable by human power and an electric motor mounted on the body for supplementing the drive force afforded by human power. (The electrically drivable bicycle, i.e., the bicycle equipped with an electric motor, will hereinafter be referred to as an "electric bicycle.")

Figure 12:
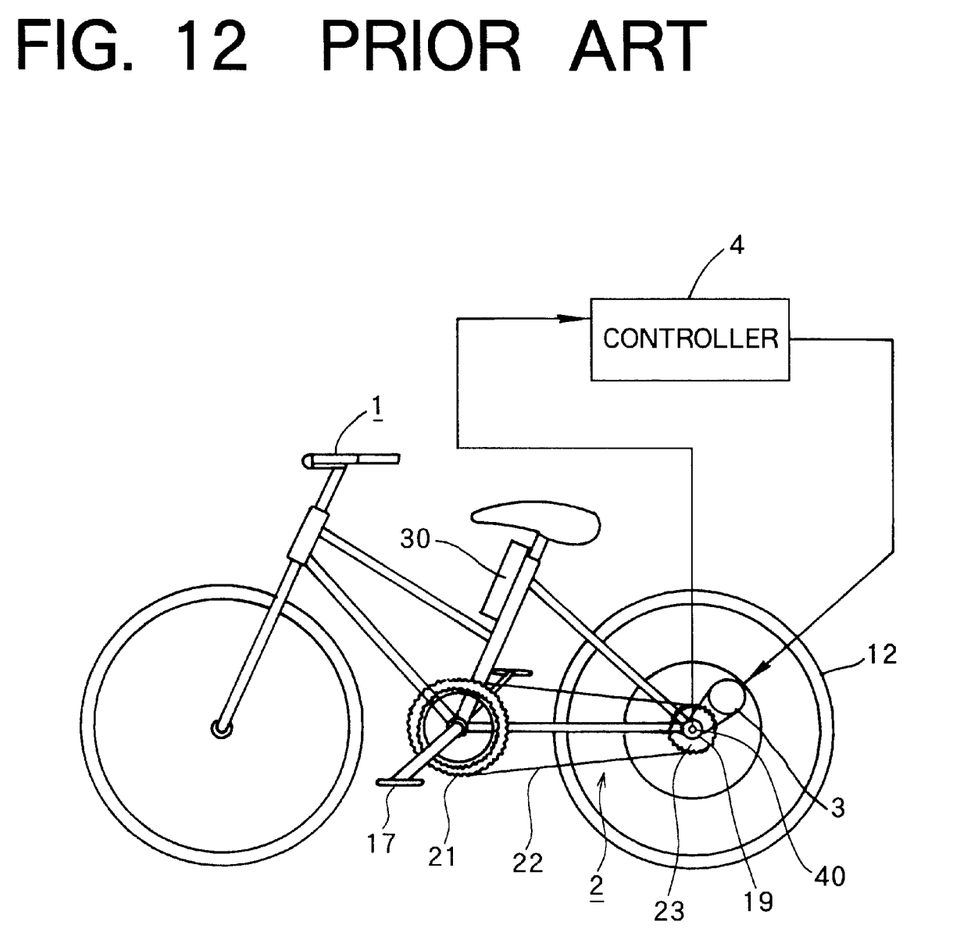
FIG. 12 is a diagram schematically showing the overall construction of a conventional electric bicycle.

FIG. 12 schematically shows the construction of an electric bicycle. As illustrated, an electric motor 3 is provided in the vicinity of the hub axle 19 of a rear wheel 12, and has an output shaft (not shown) coupled to the hub axle 19, for example, via a series of three speed reduction mechanisms (not shown). Each of the reduction mechanisms comprises, for example, a drive pulley, driven pulley and belt.

The human power torque generated by operating the pedals 17 on the body 1 of the bicycle is transmitted to the hub axle 19 of the rear wheel 12 by way of a human power transmission mechanism 2 which comprises a drive sprocket 21, chain 22 and driven sprocket 23.

The human power torque produced by operating the pedals 17 of the bicycle body 1 is detected by a torque sensor 40, and the resulting detection signal is fed to a controller 4, which in turn prepares a torque command in accordance with the input signal and gives the command to the motor 3. Consequently, the rotation of the motor 3 is subjected to speed reduction successively by the series of three speed reduction mechanisms and transmitted to the hub axle 19 of the rear wheel 12.

In this way, the rotation of the motor 3 is delivered to the rear wheel 12 on speed reduction to supplement the human drive force.

With electric bicycles, the speed of rotation of the electric motor 3 must be reduced generally to not greater than 1/20. However, since the bicycle needs to be compacted in its entirety, it is impossible to use driven pulleys of increased diameter for the speed reduction mechanism, such that the speed reducing ratio available by one reduction mechanism is as small as 3:1. In the prior art, therefore, the speed of rotation of the motor 3 is reduced successively by at least three speed reduction mechanisms to attain a speed reducing ratio of at least 20:1. This results in the problem of making the entire bicycle complex in construction and difficult to maintain.

JP-A-89483/1983 discloses an electric bicycle comprising an electric motor and a speed reduction mechanism which are provided inwardly of the outer periphery of chain of the human power transmission mechanism and which are surrounded by a complex structure. The bicycle therefore has the problem of difficult maintenance.

JP-A-262273/1993 and JP-A-278670/1993 disclose electric bicycles comprising an electric motor and a speed reduction mechanism which are arranged in the vicinity of the hub axle of the rear wheel. Accordingly, the driven sprocket and chain of the human power transmission mechanism must be removed when the motor and the reduction mechanism are to be inspected or repaired. Thus the disclosed bicycles have the problem of necessitating a cumbersome procedure for inspection or repair.

JP-A-291175/1995 and JP-A-329873/1995 disclose electric bicycles wherein a driven pulley providing a speed reduction mechanism has a large diameter, which nevertheless is only about ½ of the diameter of the rear wheel. The mechanism therefore has the problem of failing to give a sufficiently great speed reducing ratio. The mechanism further has a problem with respect to strength because the driven pulley is attached to spokes of the rear wheel.

SUMMARY OF THE INVENTION

An object of the present invention is to provide an electric bicycle of simplified construction wherein the rotation of an electric motor can be transmitted to the rear wheel as reduced to the desired speed in a smaller number of stages than conventionally.

The present invention provides an electric bicycle comprising an electric motor mounted on a body of the bicycle externally of an outer periphery of a rear wheel, and a belt transmission mechanism for transmitting the rotation of the motor to the rear wheel on speed reduction, the belt transmission mechanism comprising a drive pulley provided externally of the outer periphery of the rear wheel for receiving the power of the motor, a driven pulley having approximately the same diameter as a rim of the rear wheel and so disposed as to be rotatable with the rear wheel alongside the rim, and a belt reeved around the drive pulley and the driven pulley.

With the electric bicycle described, the rotation of the motor is transmitted to the drive pulley of the belt transmission mechanism and thereafter to the driven pulley through the belt. Since the driven pulley is approximately as large as the rear wheel in diameter, a great speed reducing ratio can be obtained. The rim of the rear wheel rotates with the driven pulley.

With the electric bicycle described above, the belt transmission mechanism affords a great speed reducing ratio as stated above, so that the desired reducing ratio can be attained by a smaller number of reduction stages than conventionally. This simplifies the construction of the bicycle in its entirety and ensures facilitated maintenance. Furthermore, the belt can be reeved around the driven pulley over a greater angle, and an increased area of contact between the belt and the driven pulley prevents the belt from slipping thereon.

With the driven pulley of the belt transmission mechanism disposed alongside the rear wheel rim, the overall bicycle retains compactness, while the driven pulley is unlikely to become an obstacle during cycling.

The motor and the drive pulley of the belt transmission mechanism are provided externally of the outer periphery of the rear wheel, so that the bicycle of the invention is easier to maintain than the conventional electric bicycles wherein such means are arranged in the vicinity of the hub axle where the structure is complex.

Stated specifically, the rear wheel is smaller than the front wheel in outside diameter, and the motor and the drive pulley are positioned in the vicinity of the outer periphery of the rear wheel.

With the electric bicycle having this specific construction, the rear wheel having a smaller outside diameter than the front wheel provides a sufficient space for the installation of the motor and the drive pulley in the vicinity of the outer periphery of the rear wheel.

At a given speed of travel, the speed of rotation of the rear wheel increases with a decrease in the outside diameter of the rear wheel, so that the smaller outside diameter of the rear wheel specifically stated above results in a decrease in the desired speed reducing ratio. Accordingly, the desired reducing ratio can be achieved by a smaller number of reduction stages.

Since the torque required of the rear wheel for giving a magnitude of propelling force can be smaller than when the wheel has a greater outside diameter, the speed reducing ratio of the series of speed reduction mechanisms to be interposed between the motor and the rear wheel can be diminished. This renders the speed reduction means compacted and lightweight.

Further since it is possible to use a driven pulley of decreased diameter in conformity with the outside diameter of the rear wheel, the difference between the drive pulley and the driven pulley in diameter can be smaller, permitting the belt to be reeved around the drive pulley over a greater angle and thereby precluding the slippage of the belt.

The front wheel is given a large outside diameter as in the prior art, so that the decrease in the outside diameter of the rear wheel produces no adverse effect on the manipulation of the handlebar, allowing the bicycle to retain stability during cycling.

Specifically stated, the output shaft of the motor is coupled to the drive pulley of the belt transmission mechanism by a speed reduction mechanism, and the speed reduction mechanism is positioned in the vicinity of the outer periphery of the rear wheel.

With the electric bicycle specifically stated, the speed reduction mechanism is disposed in the vicinity of the outer periphery of the rear wheel. The bicycle is therefore easier to maintain than the conventional electric bicycle wherein the reduction mechanism is provided in the vicinity of the hub axle where the structure is complex.

Stated specifically, the bicycle body is provided on one side thereof with a human power transmission mechanism for transmitting human power to the rear wheel and on the other side thereof with the belt transmission mechanism.

With the electric bicycle thus constructed, the human power transmission mechanism and the belt transmission mechanism are positioned as separated from each other. The output portion of the human power transmission mechanism for the rear wheel is its hub axle, whereas the output portion of the belt transmission mechanism for the rear wheel is its rim. Thus, the two mechanisms are different in the position of the output portion and therefore unlikely to interfere with each other. The human power transmission mechanism need not be removed when the belt transmission mechanism is to be inspected or repaired, hence facilitated work for inspection or repair.

Stated specifically, the driven pulley is formed integrally with the rim of the rear wheel. This decreases the number of components, rendering the electric bicycle easy to assemble.

Stated specifically, the driven pulley is provided over the outer peripheral surface thereof with a friction member in contact with the belt. Alternatively, the outer peripheral surface of the driven pulley and the inner peripheral surface of the belt are formed with respective indentation or projection patterns meshable with each other. The belt can then be reliably prevented from slipping relative to the driven pulley, permitting transmission of the rotation of the motor to the rear wheel without a loss.

The electric bicycle embodying the invention is so adapted that the rotation of the motor can be transmitted to the rear wheel as reduced to the desired speed in a smaller number of stages as described above. The bicycle is therefore simplified in overall construction and easy to maintain.

DETAILED DESCRIPTION OF EMBODIMENTS

The present invention will be described below in detail with reference to the drawings showing electric bicycles embodying the invention. In the following description, the direction in which the body 1 of a bicycle advances when the pedals are operated will be referred to as "front," and the terms "right" and "left" are used as the bicycle is seen from behind toward the front.

Figure 1:
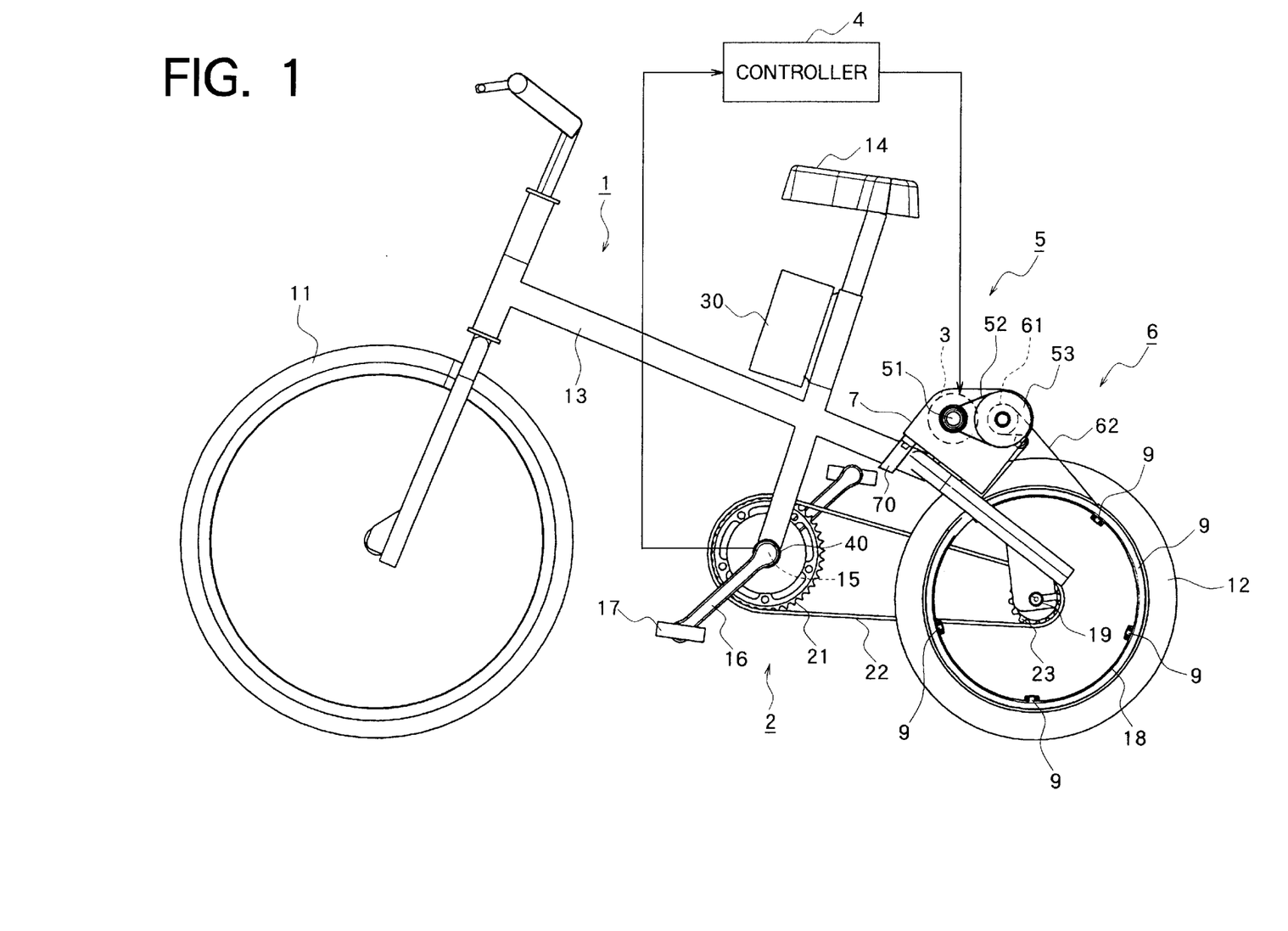
FIG. 1 is a side elevation showing the overall construction of an electric bicycle embodying the invention.

With reference to FIG. 1 showing an electric bicycle embodying the invention, the body 1 of the bicycle is provided on the right side thereof with a human power transmission mechanism 2 comprising a drive sprocket 21, chain 22 and driven sprocket 23. The human power torque generated by operating pedals 17 is transmitted to a hub axle 19 of a rear wheel 12 via cranks 16, a crank axle 15 and the human power transmission mechanism 2.

The rear wheel 12 has a smaller outside diameter than a front wheel 11. The bicycle body 1 comprises a frame 13 which is provided between a saddle 14 and the rear wheel 12 with an electric motor 3 for supplementing the human drive force.

Mounted on the left side of the bicycle body 1 are a speed reduction mechanism 5 and a belt transmission mechanism 6 for transmitting the rotation of the motor 3 to the rear wheel 12 on speed reduction. The output shaft (not shown) of the motor 3 is coupled to the rim 18 of the rear wheel 12 by the mechanisms 5 and 6. The speed reduction mechanism 5 and the belt transmission mechanism 6 will be described in greater detail later.

The crank axle 15 is provided with a torque sensor 40 for detecting the human power torque produced by operating the pedals 17. A controller 4 is mounted on the bicycle body 1 for controlling the output torque of the motor 3 based on the torque detection signal obtained from the torque sensor 40.

A battery 30 serving as a power source for the motor 3 is attached to the bicycle body 1 at a position below the saddle 14.

Next, the speed reduction mechanism 5 and the belt transmission mechanism 6 which are characteristic of the present embodiment will be described with reference to FIGS. 2 to 6.

Figure 2:
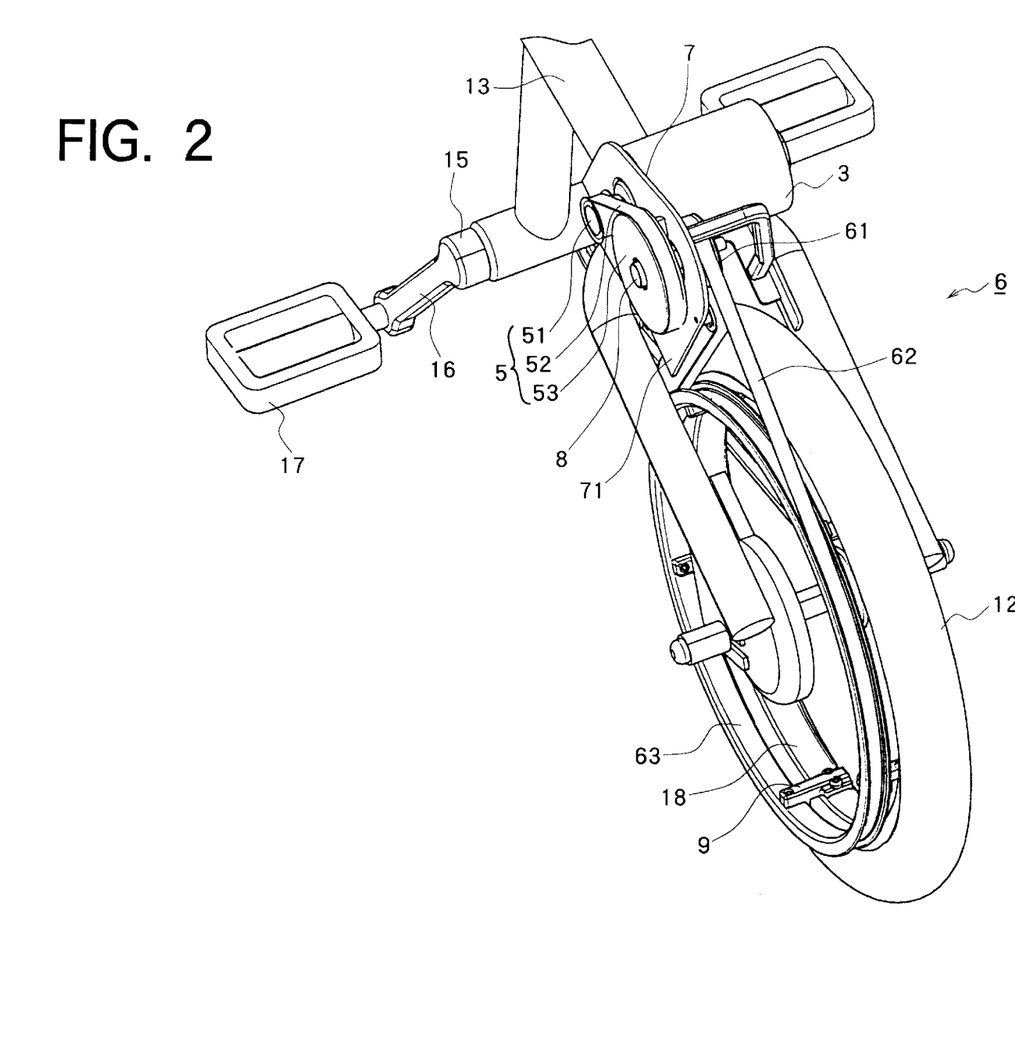
FIG. 2 is a perspective view showing a speed reduction mechanism and a belt transmission mechanism.
Figure 3:
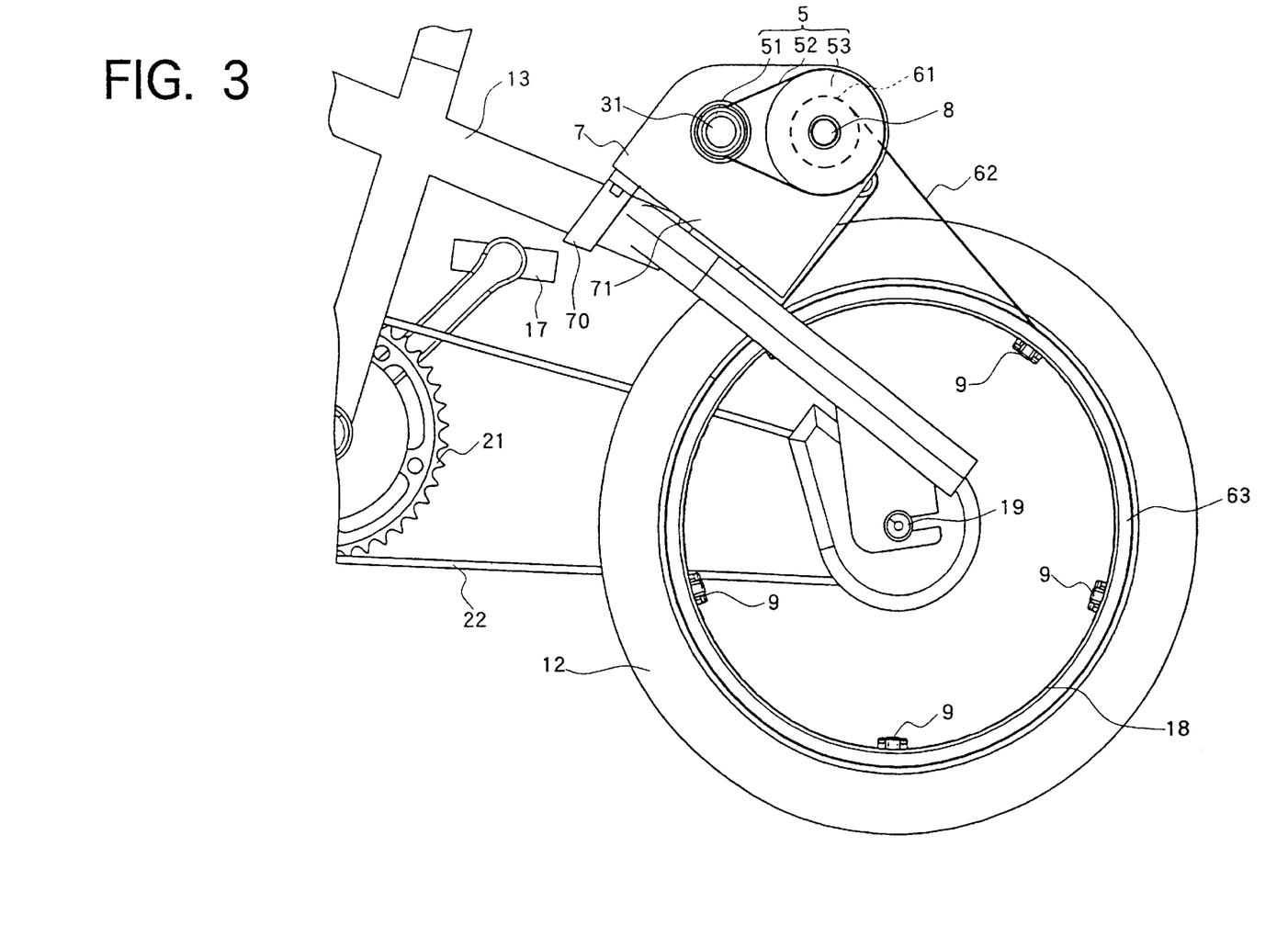
FIG. 3 is a side elevation showing the two mechanisms.
Figure 4:
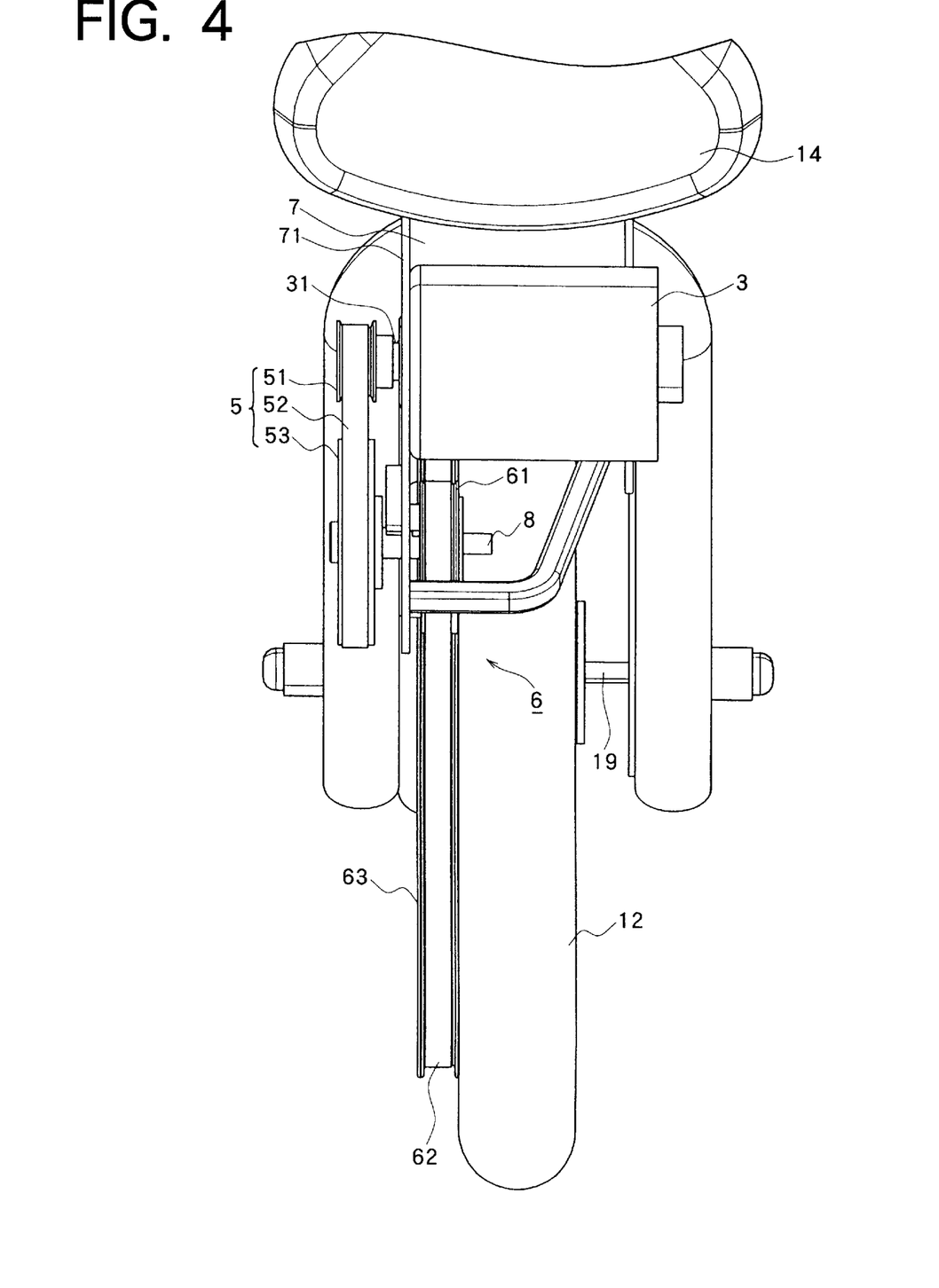
FIG. 4 is a plan view showing these mechanisms.

As shown in FIGS. 2 to 4, an L-shaped base plate 7 having a vertical wall 71 is disposed on the frame 13 between the saddle 14 and the rear wheel 12 and fixed to the frame 13 by a mount member 70.

The motor 3 is mounted on the right side of the vertical wall 71 of the base plate 7. Mounted on the left side of the wall 71 is the speed reduction mechanism 5 which comprises a drive pulley 51, belt 52 and driven pulley 53.

Figure 5:
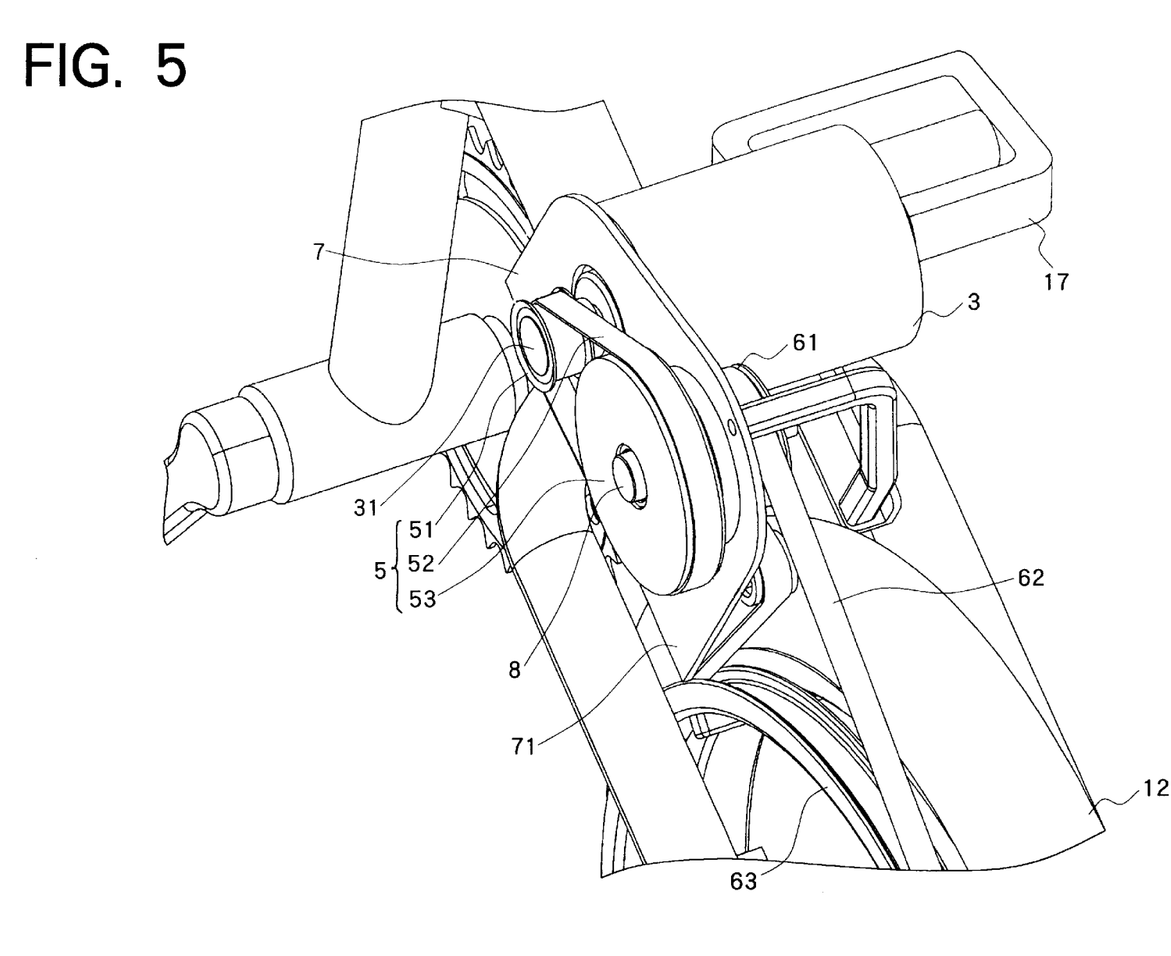
FIG. 5 is a fragmentary perspective view showing these mechanisms.

As seen in FIG. 5, the drive pulley 51 is fixed to the output shaft 31 of the motor 3. The driven pulley 53 is positioned to the rear of the drive pulley 51 and rotatably mounted on the vertical wall 71 of the base plate 7. The belt 52 is reeved around the drive pulley 51 and the driven pulley 53.

The rotation of the motor 3 is transmitted from the output shaft 31 of the motor 3 to the drive pulley 51 first and then to the driven pulley 53 by the belt 52. The speed of rotation of the driven pulley 53 is $\frac{1}{3}$ of that of the motor 3.

The belt transmission mechanism 6, which comprises a drive pulley 61, belt 62 and driven pulley 63, is mounted on the right side of the vertical wall 71 of the base plate 7 as shown in FIGS. 2 to 4.

The drive pulley 61 is positioned as opposed to the driven pulley 53 of the reduction mechanism 5 with the vertical wall 71 of the base plate 7 interposed therebetween. The drive pulley 61 and the driven pulley 53 are interconnected by a connecting shaft 8. The drive pulley 61 has a smaller diameter than the driven pulley 53 of the reduction mechanism 5. A one-way clutch (not shown) is provided between the driven pulley 53 and the connecting shaft 8.

Figure 6:
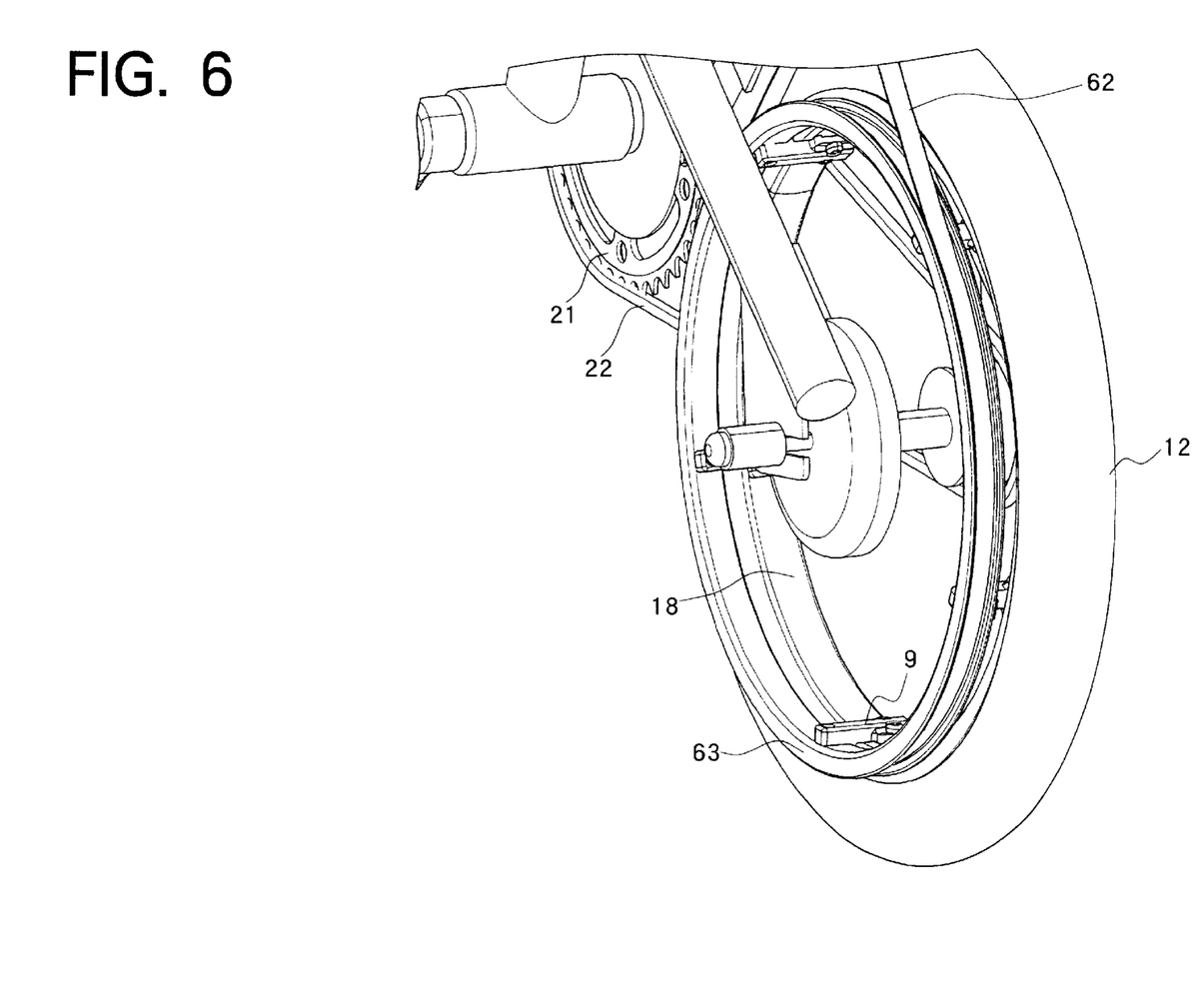
FIG. 6 is a perspective view showing a driven pulley and connecting members of the belt transmission mechanism.

The driven pulley 63 has approximately the same diameter as the rim 18 of the rear wheel 12, and is mounted on the same axle as the rim 18 and rotatable with the rear wheel 12 alongside the rim 18. As seen in FIG. 6, the driven pulley 63 is fixed to the rim 18 of the rear wheel 12 by a plurality of connecting members 9 interconnecting the inner peripheral surface of the driven pulley 63 and the inner peripheral surface of the rim 18.

The belt 62 is reeved around the drive pulley 61 and the driven pulley 63. Usable as the belt 62 are known belts including timing belt, V-belt, round belt, flat belt and others having various cross sections.

The rotation of the driven pulley 53 of the speed reduction mechanism 5 rotates the drive pulley 61 of the belt transmission mechanism 6 therewith, and the rotation is then transmitted to the driven pulley 63 via the belt 62. The reduced speed of rotation of the driven pulley 63 is $\frac{1}{7}$ of the speed of rotation of the drive pulley 61.

With the electric bicycle described above, the human power torque generated by operating the pedals 17 of the bicycle body 1 is transmitted to the hub axle 19 of the rear wheel 12 by way of the cranks 16, crank axle 15 and human power transmission mechanism 2 as shown in FIG. 1.

The human power torque produced by operating the pedals 17 of the bicycle body 1 is detected by the torque sensor 40, and the resulting detection signal is fed to the controller 4, which in turn prepares a torque command in accordance with the input signal and gives the command to the motor 3. Consequently, the motor 3 is drivingly rotated.

The rotation of the electric motor 3 first drives the drive pulley 51 of the speed reduction mechanism 5 shown in FIG. 2. The rotation of the drive pulley 51 is transmitted to the driven pulley 53 through the belt 52. This process reduces the speed of rotation of the motor 3 to $\frac{1}{3}$.

The rotation of the driven pulley 53 of the reduction mechanism 5 then drives the drive pulley 61 of the belt transmission mechanism 6, and the rotation of the drive pulley 61 is transmitted to the driven pulley 63 via the belt 62. This process reduces the speed of rotation of the motor 3 further to $\frac{1}{7}$. The rotation of the driven pulley 63 rotates the rim 18 of the rear wheel 12 together with the pulley 63.

In this way, the speed of rotation of the electric motor 3 is transmitted to the rear wheel 12 as reduced to $\frac{1}{21}$ by the reduction mechanism 5 and the belt transmission mechanism 6 to supplement the human drive force.

With the electric bicycle according to the present embodiment, the driven pulley 63 of the belt transmission mechanism 6 is as large as the rear wheel 12 in diameter so that the mechanism 6 achieves a speed reducing ratio of as great as 7:1. Accordingly, a speed reducing ratio of more than 20:1 is available by the two-stage reduction. Thus the number of stages is smaller than in the prior art wherein the three-stage reduction affords a speed reducing ratio of approximately 20:1. This renders the bicycle simplified in its overall construction and easier to maintain. Furthermore, the belt 62 can be reeved around the driven pulley 63 through an increased angle, and an increased area of contact between the belt 62 and the driven pulley 63 diminishes the slippage of the belt 62. The provision of the driven pulley 63 alongside the rim 18 of the rear wheel 12 permits the bicycle to retain compactness in its entirety, further obviating the likelihood that the pulley 63 will become an obstacle during cycling.

Because the electric motor 3, the speed reduction mechanism 5 and the drive pulley 61 of the belt transmission mechanism 6 are arranged externally of the outer periphery of the rear wheel 12, the maintenance work for these components can be performed without removing the chain 22 and the driven sprocket 23 of the human power transmission mechanism 2 although removal of these members is conventionally needed.

Furthermore, the human power transmission mechanism 2 is attached to the right side of the bicycle body 1, whereas the speed reduction mechanism 5 and the belt transmission mechanism 6 are attached to the left side of the bicycle body 1, the human power transmission mechanism 2 being thus positioned as separated from the positions of the speed reduction mechanism 5 and the belt transmission mechanism 6. Additionally, the human torque is transmitted to the hub axle 19 of the rear wheel 12, while the output torque of the motor 3 is transmitted to the rim 18 of the rear wheel 12, so that the human power transmission mechanism 2 is different from the belt transmission mechanism 6 in the position of torque output portion. Accordingly, these mechanisms are unlikely to interfere with each other. The belt transmission mechanism 6 can be inspected and repaired without the necessity of removing the human power transmission mechanism 2. This ensures facilitated work for inspection and repair.

The rear wheel 12 which is made smaller than the front wheel 11 in outside diameter provides a sufficient space between the saddle 14 and the rear wheel 12 for the installation of the motor 3, the speed reduction mechanism 5 and the drive pulley 61 of the belt transmission mechanism 6.

The torque required of the rear wheel 12 for giving a magnitude of propelling force can be smaller than in electric bicycles wherein the rear wheel has the same diameter as the front wheel, so that the speed reduction mechanisms to be interposed between the motor 3 and the rear wheel 12 can be two in number, i.e., the reduction mechanism 5 and the belt transmission mechanism 6. This realizes compacted and lightweight speed reduction means.

Since the driven pulley 63 used can be of smaller diameter than in the electric bicycle wherein the rear wheel has the same diameter as the front wheel, the difference between the drive pulley 61 and the driven pulley 63 in diameter is smaller, consequently permitting the belt 62 to be reeved around the drive pulley 61 over a greater angle and thereby preventing the belt 61 from slipping.

Figure 7:
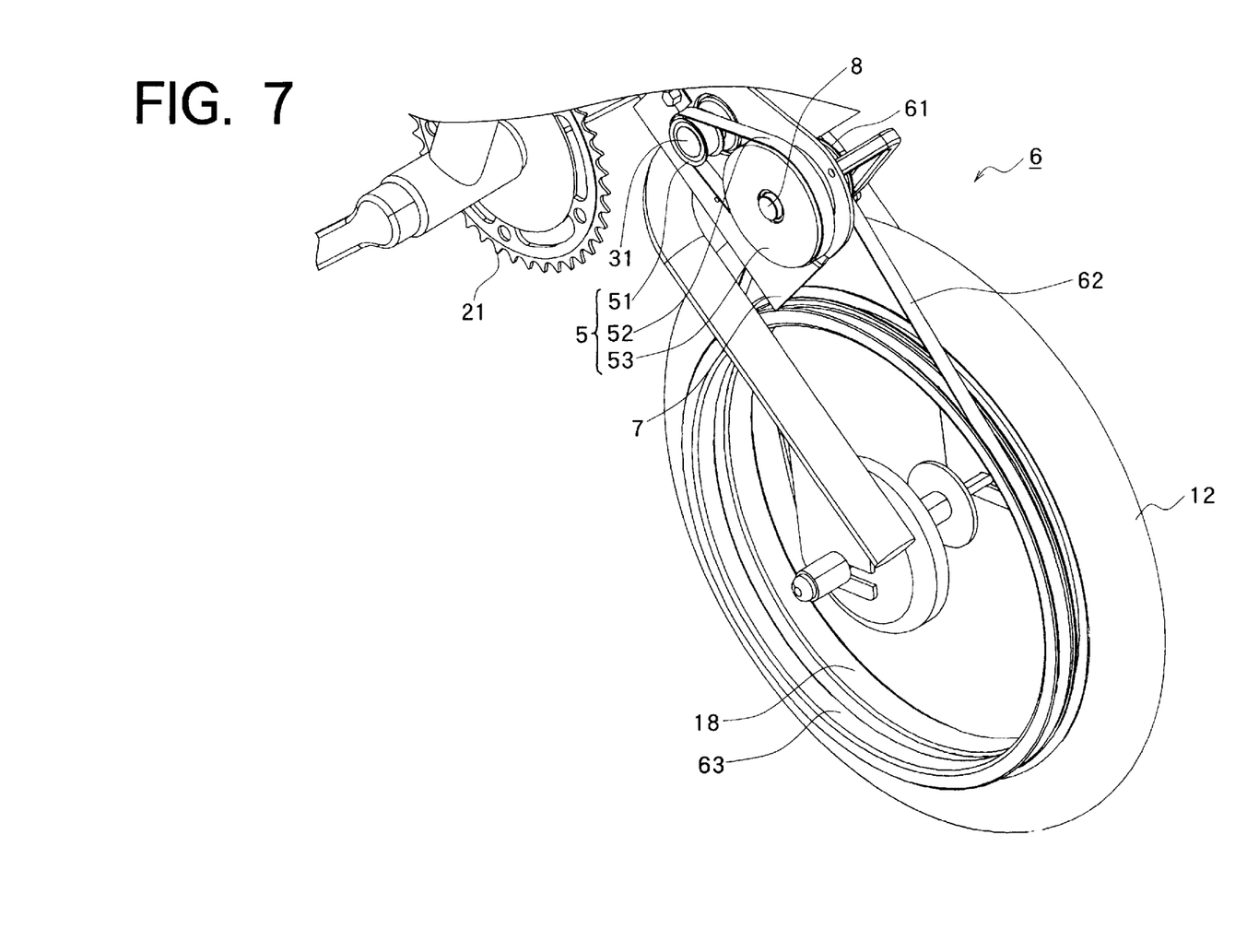
FIG. 7 is a perspective view showing another embodiment wherein the driven pulley of the belt transmission mechanism is integral with the rim of a rear wheel.
Figure 8:
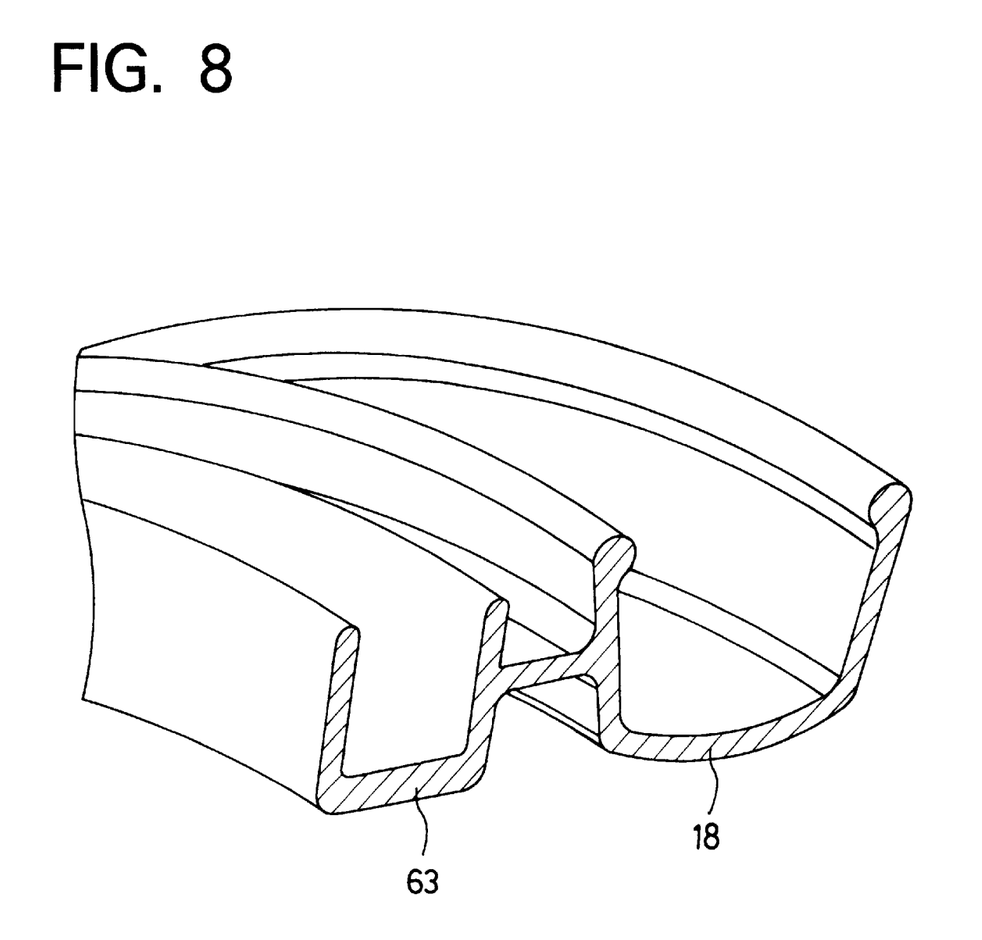
FIG. 8 is a perspective view partly broken away and showing the driven pulley and the rear wheel rim integral therewith.

Although the driven pulley 63 of the belt transmission mechanism 6 is fixed to the rim 18 of the rear wheel 12 by the connecting members 9 as shown in FIG. 6 according to the foregoing embodiment, the driven pulley 63 can be formed integrally with the rim 18 as shown in FIGS. 7 and 8. The connecting members 9 can then be dispensed with. This decreases the number of components, rendering the electric bicycle easier to assemble.

Figure 9:
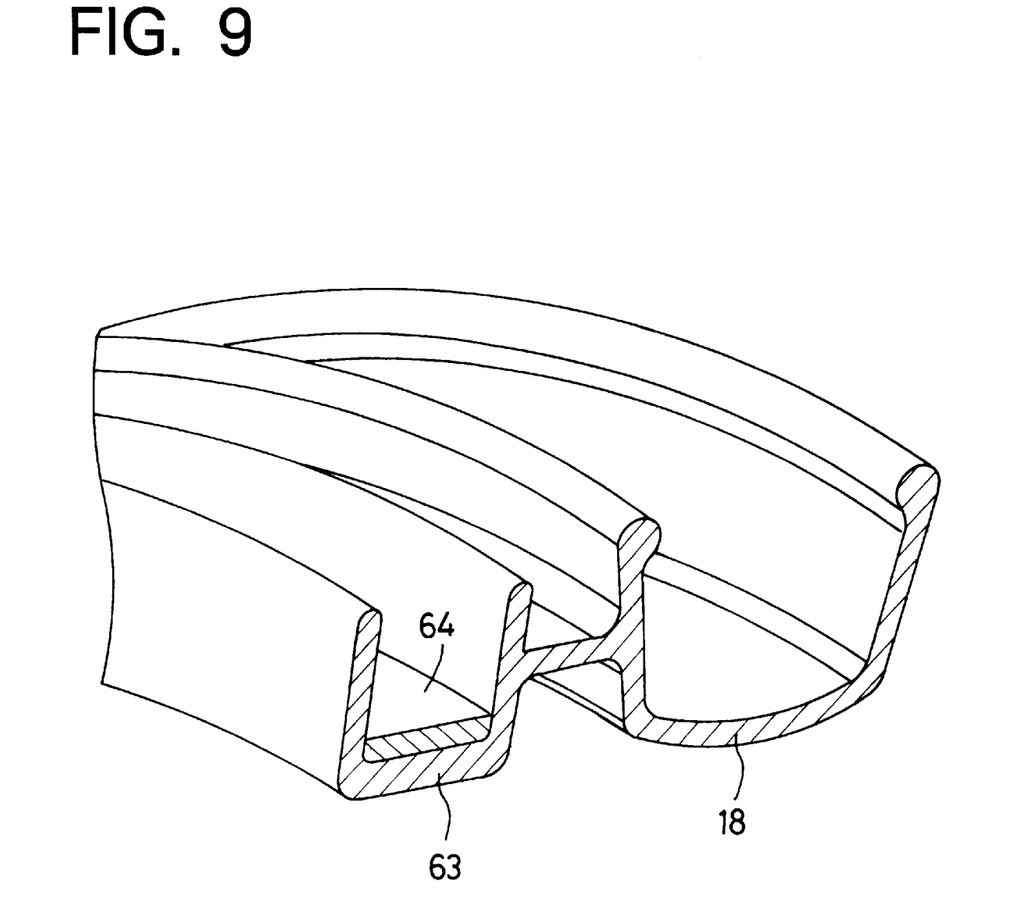
FIG. 9 is a perspective view partly broken away and showing another embodiment wherein the driven pulley is integral with the rear wheel rim, with a friction member provided on the outer peripheral surface of the driven pulley.
Figure 10:
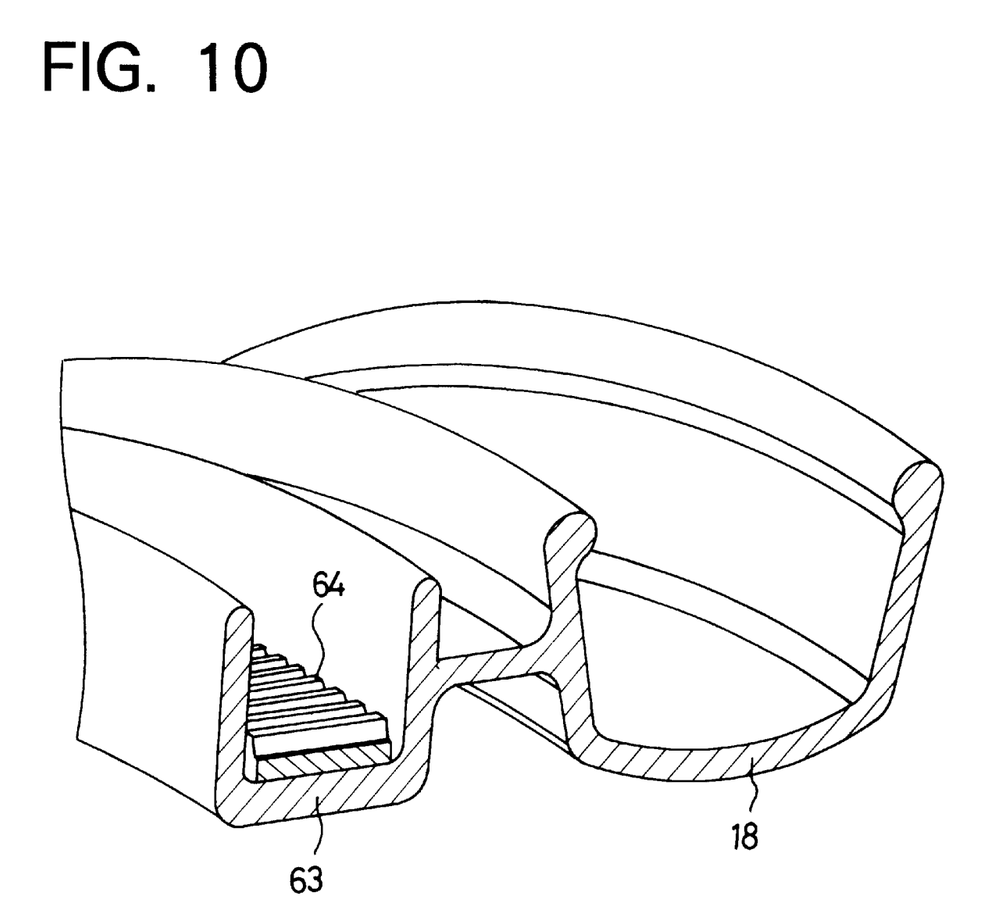
FIG. 10 is a perspective view partly broken away and showing another embodiment wherein the driven pulley is integral with the rear wheel rim, with an indentation or projection pattern formed on the outer peripheral surface of the driven pulley.
Figure 11:
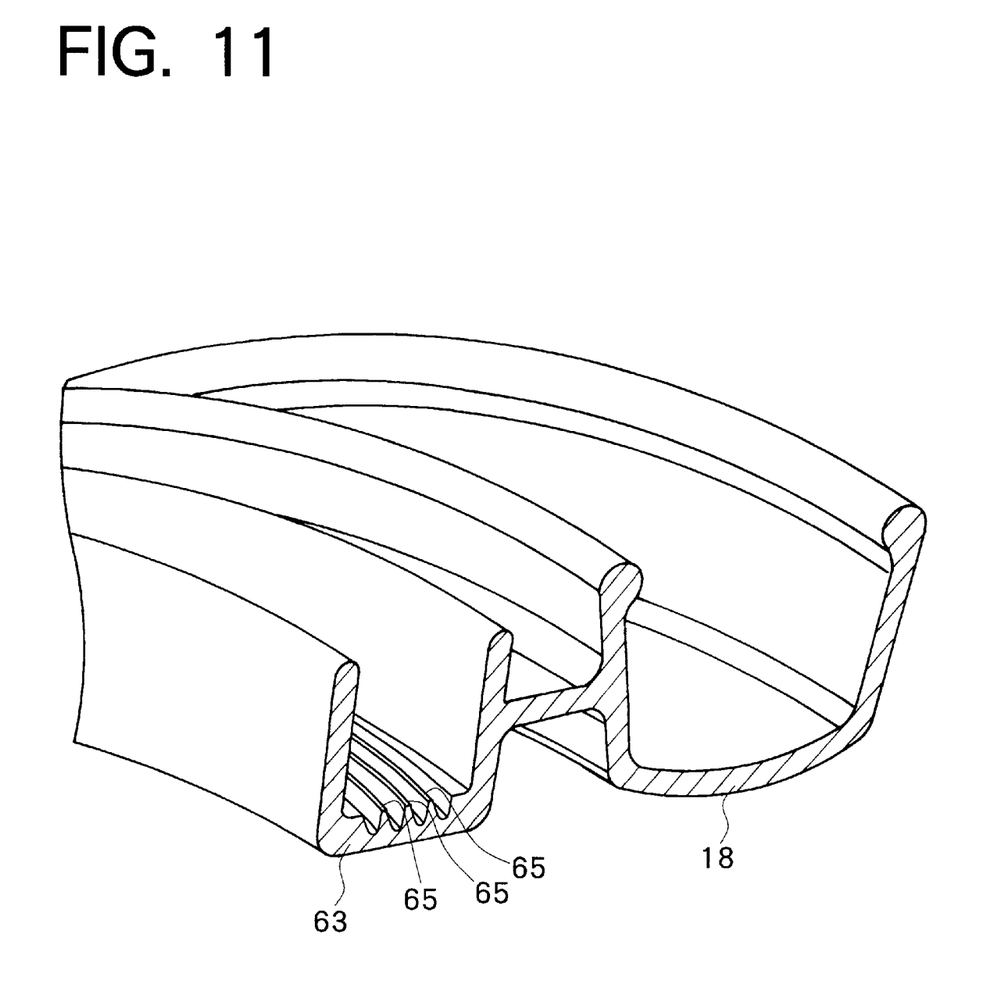
FIG. 11 is a perspective view partly broken away and showing another embodiment wherein the driven pulley is formed on the outer peripheral surface thereof with a plurality of ridges extending circumferentially thereof.

With reference to FIG. 9, the driven pulley 63 of the belt transmission mechanism 6 can be provided with a friction member 64 made, for example, of rubber or synthetic resin and covering its outer peripheral surface over the entire circumference or partially. Further as shown in FIG. 10, the outer surface of the friction member 64 and the inner peripheral surface of the belt (not shown) can be formed with respective indentation or projection patterns which are meshable with each other. Further as shown in FIG. 11, the outer peripheral surface of the driven pulley 63 of the belt transmission mechanism 6 and the inner peripheral surface of the belt (not shown) can each be formed with a plurality of ridges 65 extending circumferentially thereof, such that the ridges on one surface are in mesh with those on the other surface. Furthermore, the outer peripheral surface of the driven pulley 63 of the belt transmission mechanism 6 and the inner peripheral surface of the belt (not shown) can be formed with respective indentation or projection patterns which are meshable with each other.

In these cases, the belt 62 can be reliably prevented from slipping on the driven pulley 63, whereby the rotation of the drive pulley 61 can be transmitted to the rear wheel 12 without a loss.

The speed reduction mechanism 5, which comprises the drive pulley 51, belt 52 and driven pulley 53 according to the foregoing embodiment, can alternatively be a chain transmission mechanism or gear transmission mechanism.

The embodiments described above are intended to illustrate the present invention and should not be construed as limiting the invention defined in the appended claims or reducing the scope thereof. The bicycles of the invention are not limited to the foregoing embodiments in construction but can of course be modified variously without departing from the spirit of the invention as set forth in the claims.

What is claimed is:

1. An electric bicycle comprising
a rear wheel being smaller than a front wheel in outside diameter,
an electric motor mounted on a body of the bicycle externally of an outer periphery of the rear wheel, the motor being positioned in the vicinity of the outer periphery of the rear wheel, and
a belt transmission mechanism for transmitting the rotation of the motor to the rear wheel using speed reduction, the belt transmission mechanism comprising:
a drive pulley provided externally of the outer periphery of the rear wheel for receiving the power of the motor, the drive pulley being positioned in the vicinity of the outer periphery of the rear wheel,
a driven pulley having approximately the same diameter as a rim of the rear wheel and so disposed as to be rotatable with the rear wheel alongside the rim, and
a belt reeved around the drive pulley and the driven pulley.

2. An electric bicycle as defined in claim 1 wherein the motor has connected thereto a controller for controlling the power to be generated by the motor in accordance with pedal operating power.

3. An electric bicycle as defined in claim 1, wherein an output shaft of the motor is coupled to the drive pulley of the belt transmission mechanism by a speed reduction mechanism, and the speed reduction mechanism is positioned in the vicinity of the outer periphery of the rear wheel.

4. An electric bicycle as defined in claim 1 wherein the bicycle body is provided on one side thereof with a human power transmission mechanism for transmitting human power to the rear wheel and on the other side thereof with the belt transmission mechanism.

5. An electric bicycle as defined in claim 1 wherein the driven pulley is formed integrally with the rim of the rear wheel.

6. An electric bicycle as defined in claim 1 wherein the driven pulley is provided over an outer peripheral surface thereof with a friction member in contact with the belt.

7. An electric bicycle as defined in claim 1 wherein the outer peripheral surface of the driven pulley and an inner peripheral surface of the belt are formed with respective indentation or projection patterns meshable with each other.

* * * * *